(12) United States Patent
Kim et al.

(10) Patent No.: US 12,496,167 B2
(45) Date of Patent: Dec. 16, 2025

(54) ADHESIVE RETAINER AND MANUFACTURING METHOD THEREFOR

(71) Applicant: Smilecad Co., Ltd., Busan (KR)

(72) Inventors: Seok Jun Kim, Busan (KR); Jae Ho Jeon, Busan (KR)

(73) Assignee: Smilecad Co., Ltd., Busan (KR)

( * ) Notice: Subject to any disclaimer, the term of this patent is extended or adjusted under 35 U.S.C. 154(b) by 365 days.

(21) Appl. No.: 18/009,336

(22) PCT Filed: Jun. 9, 2021

(86) PCT No.: PCT/KR2021/007235
§ 371 (c)(1),
(2) Date: Dec. 9, 2022

(87) PCT Pub. No.: WO2021/251762
PCT Pub. Date: Dec. 16, 2021

(65) Prior Publication Data
US 2023/0233290 A1    Jul. 27, 2023

(30) Foreign Application Priority Data

Jun. 9, 2020 (KR) .................. 10-2020-0069879
Jun. 9, 2020 (KR) .................. 10-2020-0069883

(51) Int. Cl.
*A61C 7/08* (2006.01)
*A61C 7/00* (2006.01)
(Continued)

(52) U.S. Cl.
CPC ............... *A61C 7/08* (2013.01); *A61C 7/002* (2013.01); *B23K 26/0093* (2013.01); *B23K 26/38* (2013.01)

(58) Field of Classification Search
CPC .. A61C 7/08; A61C 7/002; A61C 7/00; B23K 26/02; B23K 26/0093; B23K 26/38
See application file for complete search history.

(56) References Cited

U.S. PATENT DOCUMENTS

2016/0058527 A1 * 3/2016 Schumacher ............ A61C 7/08
433/24
2019/0152152 A1  5/2019 O'Leary et al.

FOREIGN PATENT DOCUMENTS

KR   1020140115520   10/2014
KR   1020150128917   11/2015
(Continued)

*Primary Examiner* — Yogesh P Patel
(74) *Attorney, Agent, or Firm* — JCIPRNET (57) ABSTRACT

Proposed is an adhesive retainer including a body part which is formed of a shape memory alloy material and has a front surface in close contact with and attached to each tooth, wherein the body part includes a curved protrusion part which is formed to protrude toward an interdental space so as to be inserted into the interdental space, and multiple support parts having front surfaces which are in close contact with tooth surfaces of teeth outside the interdental space. A manufacturing method of the adhesive retainer includes a step of acquiring three-dimensional scanning data about a tooth arrangement, a data processing step of generating a first processing line and a second processing line, a laser cutting step of laser cutting a flat plate-shaped base material based on processing line data to form a body-part forming part, and a shape processing step of cutting the body-part forming part.

3 Claims, 9 Drawing Sheets (51) Int. Cl.
*B23K 26/00* (2014.01)
*B23K 26/38* (2014.01)

(56) References Cited

FOREIGN PATENT DOCUMENTS

| | | | |
|---|---|---|---|
| KR | 101777050 | 9/2017 | |
| KR | 1020190008316 | 1/2019 | |
| KR | 1020190111016 | 10/2019 | |
| WO | WO-2014008583 A1 * | 1/2014 | ............... A61C 7/00 |

* cited by examiner

ADHESIVE RETAINER AND MANUFACTURING METHOD THEREFOR

CROSS-REFERENCE TO RELATED APPLICATION

This application is a 371 application of the International PCT application serial no. PCT/KR2021/007235, filed on Jun. 9, 2021, which claims the priority benefits of Korean Patent Application No. 10-2020-0069879, filed on Jun. 9, 2020 and Korean Patent Application No. 10-2020-0069883, filed on Jun. 9, 2020. Each of the entirety of the above-mentioned patent applications is hereby incorporated by reference herein and made a part of this specification.

TECHNICAL FIELD

The present disclosure relates generally to adhesive retainer and manufacturing method thereof. More particularly, the present disclosure relates to an adhesive retainer which is formed of a shape memory alloy material and a manufacturing method thereof.

BACKGROUND ART

Generally, a retainer is a type of tooth arrangement maintenance device used to maintain a tooth arrangement after removing an orthodontic device after orthodontic treatment is finished.

These retainers can be largely divided into an adhesive retainer attached to teeth and an adhesive retainer that can be arbitrarily detached from teeth like a mouthpiece.

Currently, most adhesive retainers use a method of attaching a triflex wire made by twisting three wires to teeth by using a dental bond.

On the other hand, in the case of an adhesive retainer using a triplex wire, the shape of a patient's teeth is modeled with a pink alginate material, and a plaster model is made based on this, and a manufacturer manufactures the adhesive retainer by directly bending the triplex wire according to the curve of a tooth surface of the manufactured plaster model.

Since the triplex wire manufactured in this way can be transformed, the manufacturing process of the adhesive retainer is easy, and since the triplex wire has a certain amount of elasticity, the adhesive retainer allows minute physiological movements of teeth when the teeth receive a force. However, since the adhesive retainer is not in perfect close contact with a tooth surface, the adhesive retainer crosses a concave portion of each of interdental spaces of inner surfaces of teeth, which causes a tongue discomfort, and food is caught in or plaque is formed in the associated concave portion, which causes inflammation and tooth decay.

In addition, since the triplex wire is deformable, a tooth arrangement may be disarranged, and may be deformed when broken or bent portions of the triplex wire are unfolded or the twisted three strands of the triplex wire are untwisted.

Recently, an adhesive retainer to which a shape memory alloy is applied has been developed to prevent the deformation of an adhesive retainer to which a triplex wire is applied and to improve the correction effect thereof, and in this regard, in (Patent Document) Korean Patent Application Publication No. 10-2014-0115520, a tooth retainer apparatus to which wire made of a shape memory alloy is applied is disclosed.

However, the tooth retainer apparatus in the Patent Document still has a problem that the apparatus cannot make perfect contact with the outer surface of teeth, and is manufactured by coupling a plurality of brackets and wires to each other, so it is difficult to manufacture the tooth retainer apparatus.

DISCLOSURE

Technical Problem

The present disclosure is intended to provide an adhesive retainer that is tightly in close contact with multiple teeth constituting a tooth arrangement.

The present disclosure is intended to provide an adhesive retainer which is formed as one integrated component by using a shape memory alloy material.

The present disclosure is intended to provide an adhesive retainer which can be prevented from being broken.

The present disclosure is intended to provide a manufacturing method of an adhesive retainer which is tightly in close contact with multiple teeth constituting a tooth arrangement.

The present disclosure is intended to provide a manufacturing method of an adhesive retainer which is formed as one integrated component by using a shape memory alloy material.

The present disclosure is intended to provide a manufacturing method of an adhesive retainer which has structure which can be prevented from being broken.

The present disclosure is intended to provide a manufacturing method of an adhesive retainer in which when processing a base material for manufacturing the adhesive retainer, the shape defect of the adhesive retainer can be prevented.

Technical Solution

In order to accomplish the above objectives, an adhesive retainer of the present disclosure includes: a body part which is formed as one integrated component by using a shape memory alloy material and has a front surface formed along a tooth arrangement such that the front surface is in close contact with and attached to each tooth, wherein the body part includes: a curved protrusion part which is formed to protrude toward an interdental space so as to be inserted into the interdental space, the curved protrusion part having a front surface which is in close contact with inner tooth surfaces of multiple teeth defining the interdental space; and multiple support parts having front surfaces which are in close contact with tooth surfaces of teeth outside the interdental space, wherein the front surfaces of the curved protrusion part and each of the support parts are formed by considering vertical curves and inclinations of tooth surfaces corresponding to the front surfaces.

In the present disclosure, the curved protrusion part may be formed to have a front-to-rear thickness larger than a front-to-rear thickness of the support part.

In the present disclosure, a protruding end part of the curved protrusion part may be formed to have a thickest front-to-rear thickness, and the front-to-rear thickness of the protruding end part may decrease gradually toward each of opposite ends of the curved protrusion part so as to correspond to the front-to-rear thickness of the support part.

In the present disclosure, a protruding end part of the curved protrusion part may be formed to be round at front and rear surfaces thereof.

In the present disclosure, the curved protrusion part may be formed to have a width changing gradually toward an upper side of the curved protrusion part from a lower side thereof by corresponding to a shape of the interdental space into which the curved protrusion part is inserted.

In the present disclosure, the body part may be formed by cutting the front surface thereof and a rear surface thereof after laser cutting of a plate of a shape memory alloy material based on three-dimensional scanning data about the tooth arrangement.

In order to accomplish the above objectives, the present disclosure provides a manufacturing method of the adhesive retainer which has a body part including a curved protrusion part protruding to be inserted into an interdental space and a support part in close contact with a tooth surface of each tooth outside the interdental space such that the body part is in close contact with tooth surfaces of multiple teeth which constitute a tooth arrangement, the method including: a step of acquiring three-dimensional scanning data about the tooth arrangement by using a three-dimensional scanning device; a data processing step of generating a first processing line extending along tooth surfaces and interdental spaces of teeth and a second processing line spaced apart rearward from the first processing line, based on the scanning data; a laser cutting step of laser cutting a flat plate-shaped base material formed of a shape memory alloy material based on processing line data comprising data of the first processing line and the second processing line so as to form a body-part forming part having a basic shape of the body part in the base material; and a shape processing step of cutting the body-part forming part such that shapes of tooth surfaces and interdental spaces of teeth are considered in the body-part forming part.

In the present disclosure, in the laser cutting step, the body-part forming part may be laser cut such that opposite ends of the body-part forming part are connected integrally to the base material, and after the shape processing step, the manufacturing method of the adhesive retainer may further include a body-part separating step of separating the body-part forming part which is completely cut from the base material.

In the present disclosure, in the data processing step, opposite ends of the first processing line and opposite ends of the second processing line may be generated to be spaced apart from each other.

In the present disclosure, in the body part, the curved protrusion part may be formed to be thicker in a front-to-rear thickness than the support part, and in the data processing step, the first processing line and the second processing line may be processed to be spaced more apart from each other in a portion corresponding to the curved protrusion part than in a portion corresponding to the support part.

In the present disclosure, the protruding end part of the curved protrusion part may be formed to be round, and in the data processing step, a part of each of the first processing line and the second processing line corresponding to the protruding end part of the curved protrusion part may be processed to be round.

In the present disclosure, the manufacturing method of the adhesive retainer may further include: a heat treatment step of heat treating the base material in which the body-part forming part is formed; and a polishing step of polishing the base material in which the body-part forming part is formed.

Advantageous Effects

The adhesive retainer according to the embodiment of the present disclosure can have the following effects.

First, the adhesive retainer according to the embodiment of the present disclosure includes the body part whose front surface is in close contact with and attached to each tooth along a tooth arrangement such that the front surface is, and the body part is formed by considering the shape of a tooth surface and the shape of an interdental space. Particularly, the body part includes: the curved protrusion part formed to protrude toward the interdental space to be inserted into the interdental space; and multiple support parts which extend from the opposite ends of the curved protrusion part and are in close contact with tooth surfaces of teeth outside the interdental space, wherein the front surfaces of the curved protrusion part and the support part are formed by considering curves and inclinations of tooth surfaces corresponding to the front surfaces.

Accordingly, the body part is stably in close contact with teeth, and thus foreign matter can be prevented from being caught in gaps between the body part and the teeth, and the body part is more stably attached to the teeth and thus can stably support the tooth arrangement to be even.

Second, the body part is formed as one integrated component by using a shape memory alloy material, thereby reducing manufacturing costs and time, and the tooth arrangement can be stably supported by shape resilience of the body part due to the characteristics of the material of the body part. In addition, even if the tooth arrangement is disarranged, the tooth arrangement can be stably restored to an initial correct position.

Third, the curved protrusion part of a bent shape is formed to have front-to-rear thickness larger than the front-to-rear thickness of the support part, thereby effectively preventing the curved protrusion part from being broken.

In addition, the protruding end part of the curved protrusion part is formed to be round. Accordingly, the protruding end part can be effectively prevented from being broken, and the body part can have more excellent durability.

Fourth, the curved protrusion part is formed to have a width decreasing or increasing upward by corresponding to the interdental space shape corresponding thereto such that the curved protrusion part can be stably inserted into the interdental space without interruption, thereby enabling the curved protrusion part to be in close contact with the inner side surfaces of teeth defining the interdental space.

Fifth, due to the characteristics of laser processing, it is difficult to form a curve or inclination on a cut surface. However, the body part of the adhesive retainer according to the embodiment of the present disclosure is formed by processing the front and rear surfaces of the body part by considering the shapes of the tooth surfaces and interdental spaces of teeth through additional processing after laser cutting of the base material based on the three-dimensional scanning data about tooth arrangement. Accordingly, the front and rear surfaces of the body part may have shapes considering curves and inclinations in such a manner that the front and rear surfaces consider the shapes of the tooth surfaces and interdental spaces of the teeth.

The manufacturing method of an adhesive retainer according to the embodiment of the present disclosure may realize the following effects.

First, the body part of the adhesive retainer which is tightly in close contact with multiple teeth constituting a tooth arrangement may be manufactured as one integrated component by using a shape memory alloy material. Accordingly, it is possible to considerably reduce the manufacturing costs of the adhesive retainer having a structure which is tightly in close contact with the multiple teeth constituting the tooth arrangement.

Second, the body part of the adhesive retainer is manufactured in such a manner that a flat plate-shaped base material is laser cut and processed based on the three-dimensional scanning data about tooth arrangement, so time required for manufacturing the adhesive retainer can be greatly reduced. Accordingly, during the manufacturing period of the adhesive retainer, deformation of the tooth arrangement is minimized, and the manufactured adhesive retainer and teeth are stably matched, so the adhesive retainer can be easily attached thereto. Accordingly, it is possible to greatly improve a patient's treatment satisfaction.

Third, due to the characteristics of laser processing, it is difficult to form a vertical curve or inclination on a cut surface. However, in the manufacturing method of an adhesive retainer according to the embodiment of the present disclosure, after generating a processing line defining a laser-cut shape based on the three-dimensional scanning data about tooth arrangement, the base material is laser cut along the processing line to form the body-part forming part in the base material. Next, through additional processing, the shape of a tooth surface and the shape of interdental space are considered in the body-part forming part.

Accordingly, it is possible to manufacture the body part considering vertical curves and inclinations of teeth in consideration of the shapes of tooth surfaces and interdental spaces of the teeth, and the manufactured body part is in close contact with each of the teeth, so foreign matter can be prevented from being caught in space between the body part and teeth. In addition, the manufactured body part is more stably attached to the teeth and thus can stably support the tooth arrangement to be even.

Fourth, during the formation of the body-part forming part by the laser cutting of the base material, the body-part forming part is laser cut such that the opposite ends of the body-part forming part are connected to the base material, and after the shape processing step, is separated from the base material. Accordingly, during the laser cutting, the body-part forming part can be prevented from being deformed by external force or heat during shape processing, and as a result, the shape defect of the body part can be prevented.

Fifth, the body part of the adhesive retainer includes the curved protrusion part protruding to be inserted into interdental space, and the support part in close contact with a tooth surface of a tooth outside the interdental space, and in the data processing step of the manufacturing method of an adhesive retainer of the present disclosure, the first processing line and the second processing line which define a laser-cut shape are generated. In this case, the first processing line and the second processing line are processed to be spaced more apart from each other in a portion corresponding to the curved protrusion part than in a portion corresponding to the support part.

Accordingly, the curved protrusion part having a shape bent to be inserted into an interdental space may be formed to have front-to-rear thickness larger than the front-to-rear thickness of the support part, so it is possible to manufacture the adhesive retainer in which the curved protrusion part is effectively prevented from being broken.

Sixth, in the data processing step, in each of the first processing line and the second processing line, a part corresponding to the protruding end part of the curved protrusion part is processed to be round.

Accordingly, the protruding end part of the curved protrusion part may be formed to be round, and the breakage of the protruding end part of the curved protrusion part can be effectively prevented, and the body part having more excellent durability can be manufactured.

BEST MODE

Hereinafter, an embodiment of the present disclosure will be described in detail with reference to the accompanying drawings.

However, the present disclosure is not limited to the embodiment in which the idea of the present disclosure is presented, and by adding, changing, or deleting another component, it is possible to easily propose another degenerative invention or another embodiment included within the scope of the present disclosure.

Figure 1:
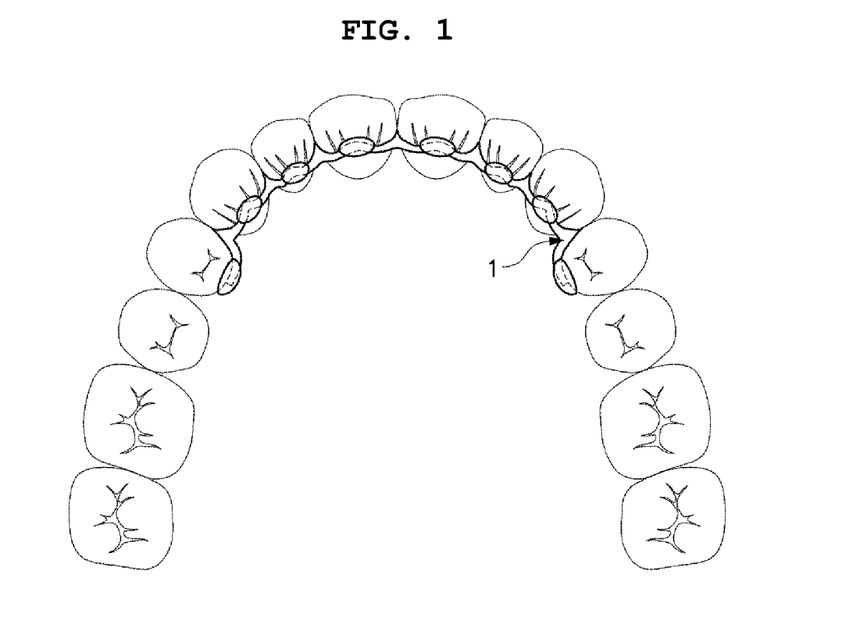
FIG. 1 is a view showing a state in which an adhesive retainer is attached to teeth according to an embodiment of the present disclosure.

FIG. 1 is a view showing a state in which an adhesive retainer is attached to teeth according to the embodiment of the present disclosure.

Figure 2:
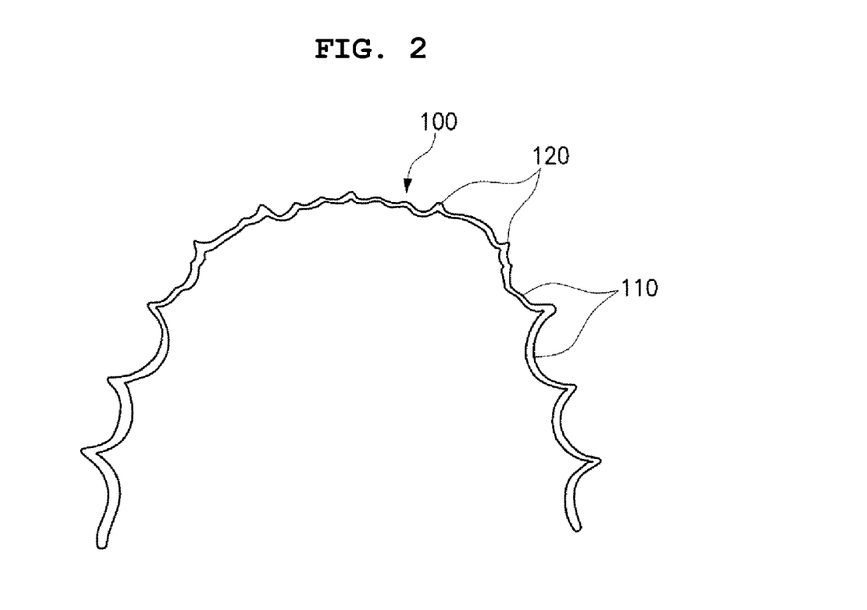
FIG. 2 is a top plan view of the adhesive retainer according to the embodiment of the present disclosure.

FIG. 2 is a top plan view of the adhesive retainer according to the embodiment of the present disclosure.

Figure 3:
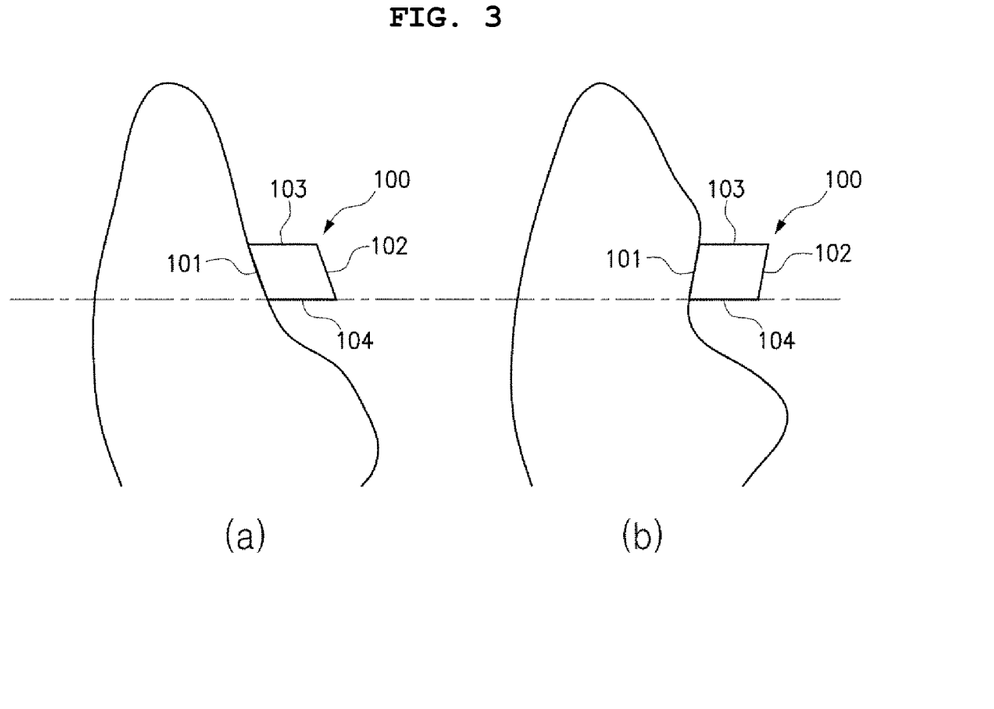
FIG. 3 is a view showing sections of a first part and a second part of a body part which are respectively attached to different teeth according to the embodiment of the present disclosure.

FIGS. 3(*a*) and 3(*b*) are views showing sections of a first part and a second part of a body part which are respectively attached to different teeth according to the embodiment of the present disclosure.

Figure 4:
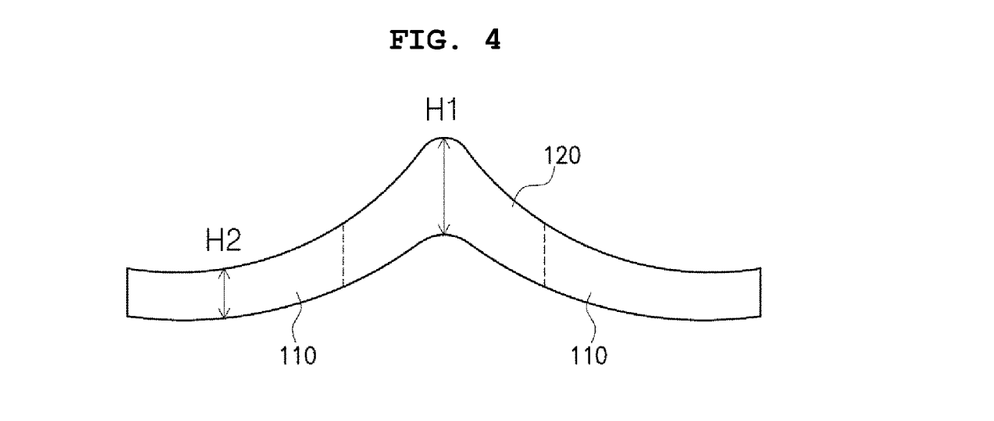
FIG. 4 is a top plan view of a curved protrusion part according to the embodiment of the present disclosure.

FIG. 4 is a top plan view of a curved protrusion part according to the embodiment of the present disclosure.

Figure 5:
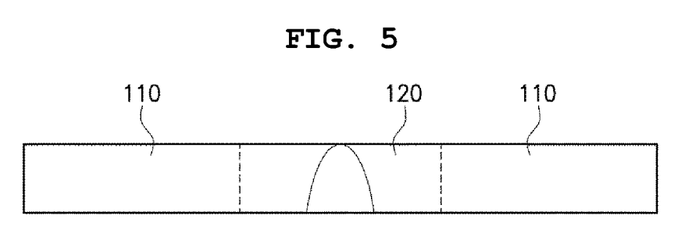
FIG. 5 is a front view of the curved protrusion part according to the embodiment of the present disclosure.

FIG. 5 is a front view of the curved protrusion part according to the embodiment of the present disclosure.

The adhesive retainer 1 according to the embodiment of the present disclosure may include the body part 100.

The body part 100 may be formed to be tightly in close contact with teeth along a tooth arrangement constituted by the multiple teeth such that the body part 100 is in close contact with and attached to the teeth by separate adhesive.

In addition, the body part 100 may be formed of a shape memory alloy material.

Accordingly, a tooth arrangement may be stably maintained by the body part 100, and even if the tooth arrangement is disarranged while the body part 100 is attached to each tooth, the tooth arrangement may be restored to an initial even state thereof by shape resilience of the body part 100.

More specifically, the body part 100 may be formed long by corresponding to a tooth arrangement as a whole, and may be formed to have an approximate bow shape when viewed from above. In addition, the body part 100 may be formed to have vertical height and front-to-rear thickness which are predetermined.

The body part 100 may be formed to have a front surface 101 attached to a tooth surface, a rear surface 102 at a side opposite to the front surface 101, an upper surface 103 connecting the upper ends of the front surface 101 and the rear surface 102 to each other, and a lower surface 104 connecting the lower ends of the front surface 101 and the rear surface 102 to each other.

Referring to FIGS. 1 and 2, the body part 100 may include at least one support part 110 attached to a tooth surface of each tooth, and at least one curved protrusion part 120 inserted into interdental space defined between teeth adjacent to each other.

The curved protrusion part 120 may be defined as a part of the body part 100 protruding toward interdental space such that the curved protrusion part 120 is inserted into interdental space and is in close contact with side surfaces of teeth.

When multiple curved protrusion parts 120 are formed, each of the multiple curved protrusion parts 120 may be considered to be connected to each other by the support part 110.

Meanwhile, the body part 100 may be formed by considering the shape of tooth surface of each tooth and the shape of interdental space such that the contact area of the body part 100 with each tooth can increase.

For example, the body part 100 may be formed by considering the shape of the interdental space of the tooth arrangement and the curve and inclination of a tooth surface of each tooth. In this case, the curve of a tooth surface may include a horizontal curve of a tooth surface and a vertical curve of a tooth surface. In addition, the inclination of a tooth surface may include a horizontal inclination of a tooth surface and a vertical inclination of a tooth surface.

Accordingly, the contact area of the body part 100 with teeth increases, and thus the body part 100 can be more stably in close contact with the teeth, and the body part 100 may stably support the teeth. In addition, foreign matter can be prevented from being caught in gaps between the body part 100 and the teeth.

More specifically, referring to FIGS. 3(a) and 3(b), each tooth constituting the tooth arrangement may have various shapes of a tooth surface thereof and thus may have the shape of a tooth surface which is curved, inclined, or vertical.

The front surface 101 of the body part 100 may be formed to be curved, inclined, or vertical by corresponding to the shape of the tooth surface of each tooth. That is, the front surfaces of the support part 110 and the curved protrusion part 120 may be formed to be curved, inclined, or vertical.

In this case, when multiple support parts 110 and multiple curved protrusion parts 120 are formed, each front surface of the support parts 110 and curved protrusion parts 120 may have a different sectional shape. That is, each front surface of the multiple support parts 110 and the multiple curved protrusion parts 120 may have an independent sectional shape.

Of course, one tooth may have the shape of a tooth surface which may be formed variously according to a position of the tooth, and in response to this, even the front surface of each of one support part 110 and one curved protrusion part 120 may not have a uniform sectional shape but may have an independent sectional shape along the extension direction of the body part. That is, each part of the body part 100 may be continuous but may have an independent sectional shape along the extension direction.

Meanwhile, the rear surface 102 of the body part 100 may be formed to have a shape corresponding to the shape of the front surface thereof and may be formed parallel to the front surface 101.

Meanwhile, the upper surface 103 and the lower surface 104 of the body part 100 may also be formed to have the same shapes and may be formed parallel to each other. For example, the upper surface 103 and lower surface 104 of the body part 100 may be formed to have horizontal planar shapes as a whole.

Accordingly, the body part 100 may be formed to have identical vertical height as a whole.

Referring to FIGS. 3(a) and 3(b), sectional shapes of the support parts 110 of the body part 100 in contact with different teeth will be described as an example. As illustrated in FIG. 3(a), when the tooth surface of a first tooth in contact with the body part 100 is inclined downward toward a rear of the first tooth from a front thereof, the front surface of the first part of a corresponding body part 100 may be formed to be inclined downward toward a rear of the first part from a front thereof.

In addition, the rear surface of the first part of the body part 100 may also be formed to be inclined downward toward the rear of the first part from the front thereof. In addition, the upper and lower surfaces of the first part of the body part 100 may be formed horizontally.

On the other hand, as illustrated in FIG. 3(b), when the tooth surface of a second tooth in contact with the body part 100 is formed to be inclined upward toward a rear side of the second tooth from a front side thereof, the front surface of the second part of a corresponding body part 100 may be formed to be inclined upward toward a rear side of the second part from a front side thereof.

In addition, the rear surface of the second part of the body part 100 may also be formed to be inclined upward toward the rear side of the second part from the front side thereof. In addition, the upper and lower surfaces of the second part of the body part 100 may be formed horizontally.

Meanwhile, the curved protrusion part 120 may be formed to have a shape that continues smoothly as a whole so that there are no sharp edge and valley when viewed from above.

For example, the end part of the curved protrusion part 120 protruding from the front surface of the body part may be formed to be round. In addition, the end part of the curved protrusion part 120 recessed from the rear surface of the body part may be formed to be round.

Accordingly, the curved protrusion part 120 having a bent shape can be effectively prevented from being broken.

In addition, as illustrated in FIG. 4, the curved protrusion part 120 may be formed to have front-to-rear thickness larger than front-to-rear thickness of the support part 110.

That is, the front-to-rear thickness T1 of the protruding end part of the curved protrusion part 120 may be thicker than the front-to-rear thickness T2 of the support part 110. In addition, as the curved protrusion part 120 approaches the support part 110, the front-to-rear thickness of the curved protrusion part 120 may gradually decrease to correspond to the front-to-rear thickness T2 of the support part 110.

In this case, the front-to-rear thickness T1 of the protruding end part of the curved protrusion part 120 may be formed to be 10% to 30% thicker than the front-to-rear thickness T2 of the support part 110, and may preferably formed to be 20% thicker than the front-to-rear thickness T2.

For example, the body part 100 may be formed to have various thicknesses according to specifications. For example, the body part 100 may be formed to be 0.3 mm, 0.43 mm, or 0.5 mm in thickness.

When the body part 100 is 0.3 mm in thickness, the front-to-rear thickness T2 of the support part 110 may be formed to be 0.3 mm. In addition, the front-to-rear thickness T1 of the protruding end part of the curved protrusion part 120 may be 0.36 mm.

Accordingly, due to the reinforcement of the thickness of the curved protrusion part 120, the occurrence of breakage of the curved protrusion part 120 can be more effectively prevented, and the deformation of the body part 100 can be effectively prevented.

In addition, as illustrated in FIG. 5, the curved protrusion part 120 may be formed to have a width changing gradually toward an upper side of the curved protrusion part 120 from a lower side thereof by corresponding to the shape of the interdental space.

For example, the body part 100 may be attached to an upper tooth arrangement, or may be attached to a lower tooth arrangement. Interdental space defined in the upper tooth arrangement has a characteristic that the width of the interdental space increases toward the upper side of the interdental space from the lower side thereof. In addition, interdental space defined in the lower tooth arrangement has a characteristic that the width of the interdental space decreases toward the upper side of the interdental space from the lower side thereof.

When the body part 100 is attached to a lower tooth arrangement, the curved protrusion part 120 may be formed to have a width decreasing gradually toward the upper side of the curved protrusion part 120 from the lower side thereof. Accordingly, the front surface of the curved protrusion part 120 may be regarded as a structure formed by considering the inclinations and curves of the inner surfaces of teeth defining the interdental space.

Accordingly, the curved protrusion part 120 may be inserted into the interdental space without interruption, and may be tightly in close contact with the inner side surfaces of teeth defining the interdental space.

Meanwhile, the body part 100 may be manufactured by further processing a shape memory alloy material after laser cutting of the shape memory alloy material.

In addition, the body part 100 may be manufactured in such a manner that a shape memory alloy material is laser cut and then heat treated. Accordingly, the body part 100 may have higher hardness, and a shape thereof may be stabilized.

In addition, the body part 100 may be manufactured by polishing the surface of the body part 100. Accordingly, the body part 100 may be formed to have a smoother surface, and a sharp part of the body part 100 may be removed, so the body part 100 may be formed to have a safe structure as a whole.

Hereinafter, the manufacturing method of the adhesive retainer 1 according to the embodiment of the present disclosure will be described in detail with reference to the accompanying drawings.

Figure 6:
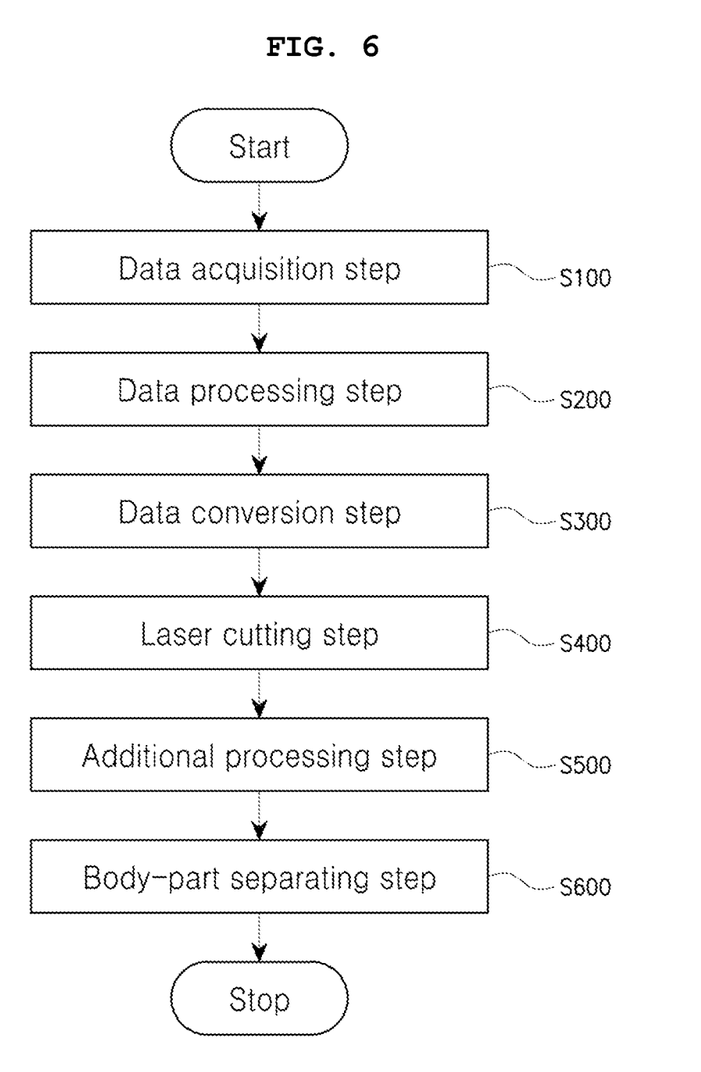
FIG. 6 is a flowchart showing a manufacturing method of the adhesive retainer according to the embodiment of the present disclosure.

FIG. 6 is a flowchart showing the manufacturing method of the adhesive retainer according to the embodiment of the present disclosure.

Figure 7:
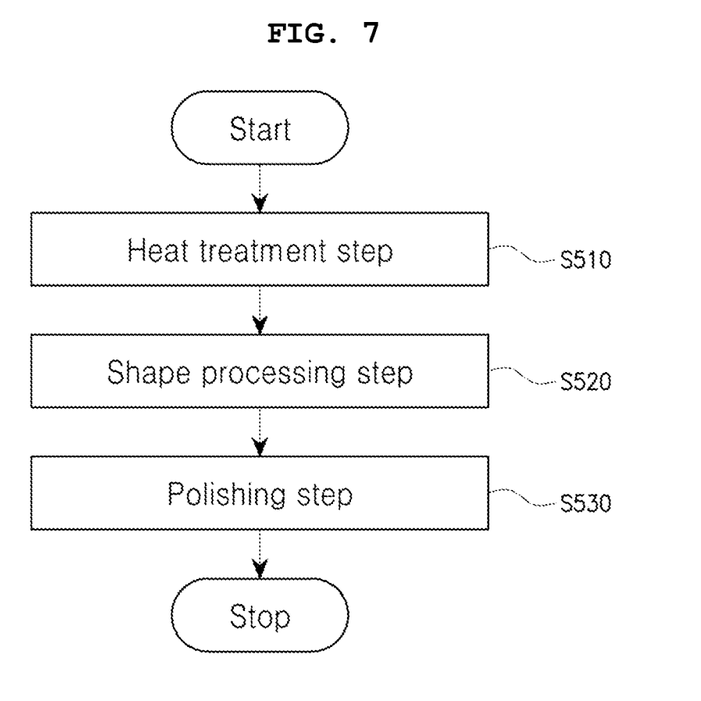
FIG. 7 is a flowchart showing an additional processing step in detail according to the embodiment of the present disclosure.

FIG. 7 is a flowchart showing an additional processing step in detail according to the embodiment of the present disclosure.

Figure 8:
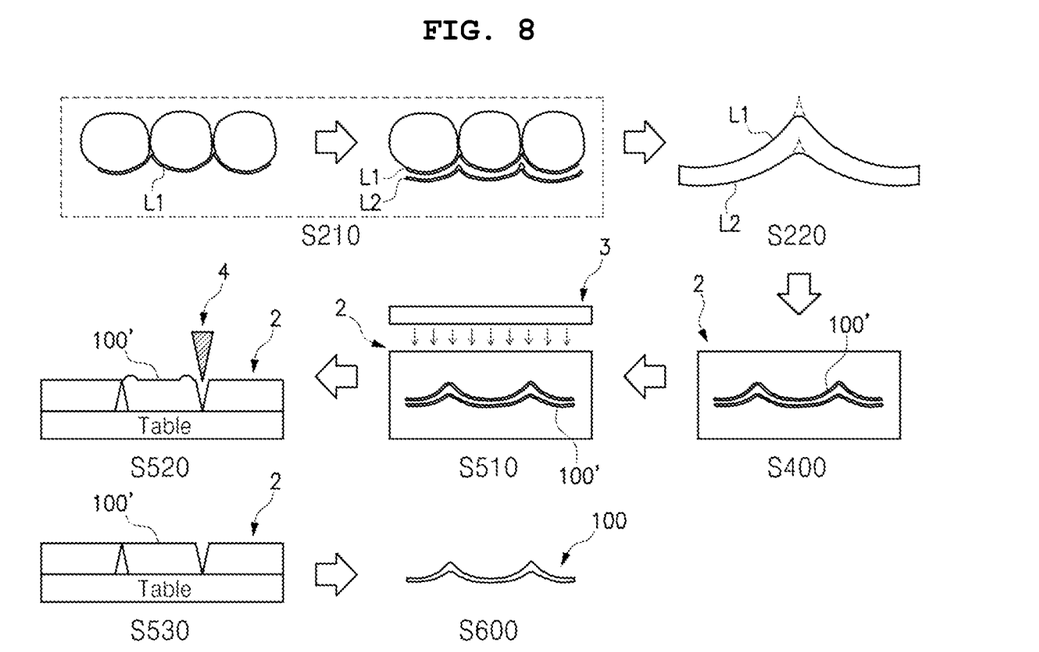
FIG. 8 is a view roughly showing a manufacturing process of the body part according to the embodiment of the present disclosure.

FIG. 8 is a view roughly showing the manufacturing process of the body part according to the embodiment of the present disclosure.

Figure 9:
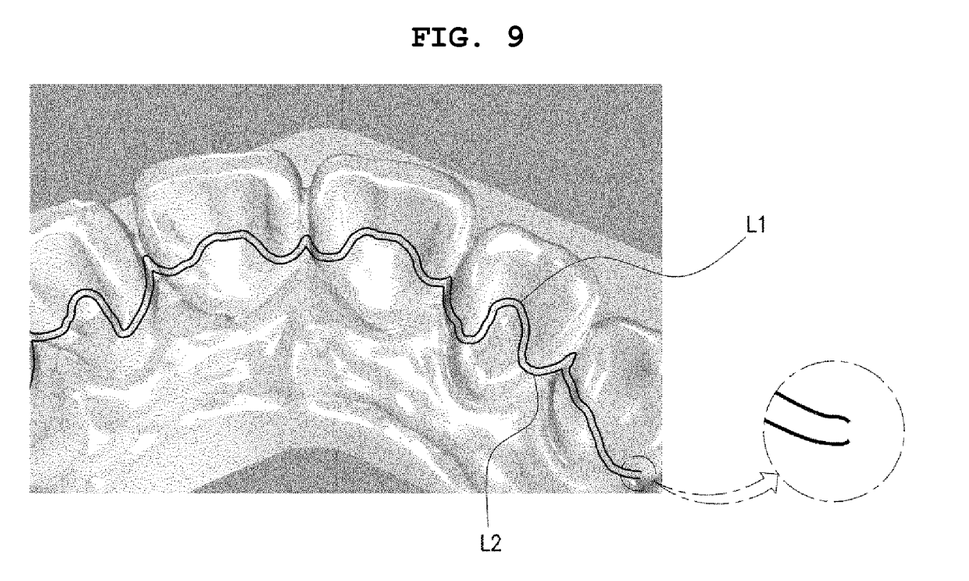
FIGS. 9 and 10 are views showing a processing operation performed in a data processing step according to the embodiment of the present disclosure.
Figure 10:
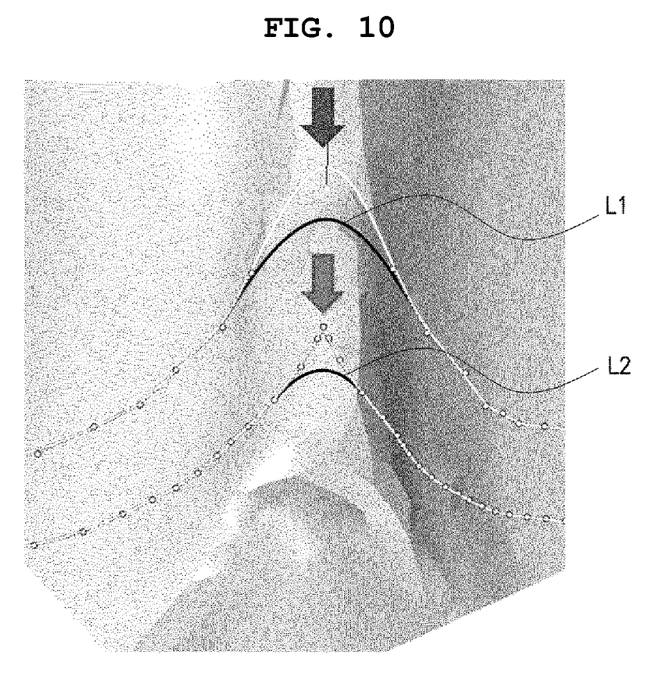

FIGS. 9 and 10 are views showing a processing operation performed at a data processing step according to the embodiment of the present disclosure.

Figure 11:
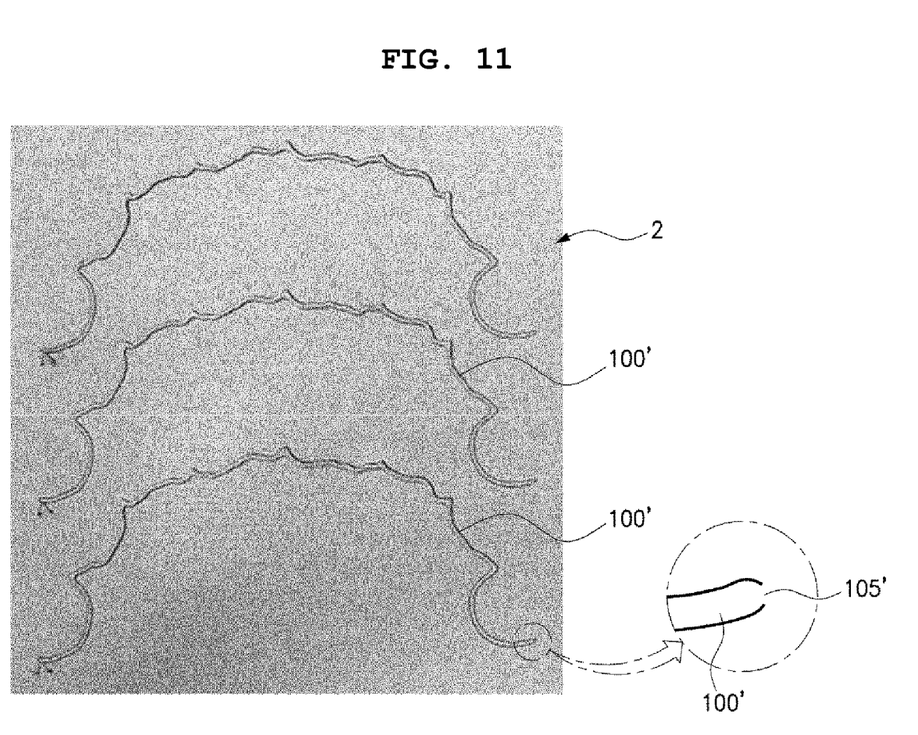
FIG. 11 is a view showing the shape of a base material after a laser cutting step is performed according to the embodiment of the present disclosure.

FIG. 11 is a view showing the shape of a base material after a laser cutting step is performed according to the embodiment of the present disclosure.

The manufacturing method of an adhesive retainer according to the embodiment of the present disclosure may include a data acquisition step of acquiring the scanning data of the tooth arrangement; a data processing step of processing the scanning data; a data conversion step of converting corrected data into laser processing data; the laser cutting step of laser cutting a base material; an additional processing step of additionally processing the laser cut base material; and a body-part separating step of separating the body part from an additionally processed base material.

First, three-dimensional scanning data about a tooth arrangement may be acquired by using a three-dimensional scanning device.

In this case, the scanning data refers to photographing data obtained by photographing the upper or lower tooth arrangement to which the body part 100 will be attached by using a 3D camera.

The scanning data may include the tooth arrangement, the shape of interdental space defined in the tooth arrangement, and the curve or inclination of the tooth surface of each tooth.

The scanning data may be a file corresponding to an STL file format. [S100, the data acquisition step]

After the data acquisition step, the data processing step for generating a processing line defining a laser-cut shape for manufacturing the body part 100 based on the scanning data may be performed. The data processing step may include a processing line generation step and a processing line correction step. [S200, the data processing step]

After acquiring the scanning data, a position of a virtual body part may be preset based on the scanning data, and a position of a reference surface on which the virtual body part is located may be preset based on the associated scanning data.

The reference surface may be preset to cross multiple teeth constituting the tooth arrangement, and may be preset horizontally.

Next, a tangent line on which the tooth arrangement and the reference surface are in contact with each other extracted, and based on this, a processing line for defining a laser-cut shape on the reference surface may be generated. The processing line may include a first processing line L1 in contact with tooth surfaces of the tooth arrangement, and a second processing line L2 spaced apart from the first processing line L1.

The first processing line L1 may extend along the tooth surface and interdental space of each tooth and may be formed by considering the shapes of interdental space and tooth surface of the tooth arrangement.

In addition, after generating the first processing line L1, the second processing line L2 spaced by a predetermined distance apart from the first processing line L1 may be generated as illustrated in FIG. 9.

The second processing line L2 may be formed into a shape corresponding to the shape of the first processing line L1. In addition, on the reference surface, the second processing line L2 may be spaced apart from the first processing line L1, and may be spaced apart rearward therefrom for generation of the front-to-rear thickness of the body part 100.

Due to a distance by which the first processing line L1 and the second processing line L2 are spaced apart from each other, an approximate thickness of the body part 100 may be preset.

The opposite ends of the first processing line L1 and the second processing line L2 may not be connected to each other, but may be formed by being spaced apart by a predetermined distance from each other. [S210, the processing line generation step]

Meanwhile, referring to FIG. 10, in each of the first processing line L1 and the second processing line L2, a protruding end part corresponding to the curved protrusion part 120 may be formed by being processed to be round. That is, the bend end part of each of the first processing line L1 and the second processing line L2 may be processed not to be sharp.

In addition, the first processing line L1 and the second processing line L2 may be processed to be spaced more apart from each other in a portion corresponding to the curved protrusion part 120 than in a portion corresponding to the support part 110. Accordingly, the front-to-rear thickness T1 of the curved protrusion part 120 may be formed to be thicker than the front-to-rear thickness T2 of the support part 110.

In this case, the first processing line L1 and the second processing line L2 may be formed to be spaced more apart from each other than the front-to-rear thickness of the body part 100 to be manufactured. Accordingly, even if thickness loss of the base material due to laser cutting and additional processing occurs, the body part 100 may be manufactured according to required specifications. [S220, the processing line correction step]

When the processing line correction step is completed, processing line data including data of the first and second processing lines may be converted into the laser processing data.

For example, the processing line data may be stored as two-dimensional data.

In addition, by using a program that automatically generates the movement path of a laser cutting machine based on the two-dimensional data, the processing line data may be converted into the laser processing data.

The generated laser processing data may be a two-dimensional CAD file considering the processing line data. [S300, the data conversion step]

When the data conversion step is completed, the laser processing data may be input to the laser cutting machine for laser processing.

In addition, the base material 2 into which the laser cutting machine operates and is put according to the laser processing data may be laser cut. That is, the laser cutting machine may be regarded to perform the laser cutting of the base material 2 based on the processing data.

Specifically, the base material 2 may be provided in the form of a flat plate made of a shape memory alloy material. That is, the base material 2 may be a plate formed of the shape memory alloy. For example, the base material 2 may be a thin plate of Nitinol.

The laser cutting machine may be provided with a jig on which the base material 2 is seated and fixed. In addition, the base material 2 may be seated and fixed on the jig.

The laser cutting machine may be given a preset value before laser cutting. For example, an operator may preset values such as processing speed 200 mm/s, processing acceleration 3000 mm/s, pulse-type pulse power 300 w, pulse frequency 600 hz, pulse time 400 us, and argon gas pressure 3.0 mpa, etc.

After the base material 2 is input and the preset value of the laser cutting machine is preset, the operator may operate the laser cutting machine.

When the laser cutting machine operates, the base material 2 is cut along the processing lines by the laser cutting machine, and a body-part forming part 100' having the basic shape of the body part 100 may be cut and formed in the base material 2.

Meanwhile, the opposite ends of the first processing line and the opposite ends of the second processing line are formed by being spaced apart from each other, and the opposite ends of the body-part forming part 100' may be connected integrally to the base material 2 without being separated from the base material 2.

Specifically, as illustrated in FIG. 11, the opposite ends of the body-part forming part 100' are formed to be connected integrally to the base material 2, and other parts except for the opposite ends may be formed to be physically separated from the base material 2 by laser cutting.

Referring to FIG. 11, a connection part 105' connected integrally to the base material 2 may be formed on each of the opposite ends of the body-part forming part 100'.

Since the connection part 105' is formed, the body-part forming part 100' is not deformed by heat generated during laser cutting. In addition, the body-part forming part 100' can be effectively prevented from being distorted due to temperature change during cooling of the base material 2 after the laser cutting.

That is, after the laser cutting and cooling are completed, the body-part forming part 100' can be separated from the base material 2, and can be stably manufactured in a required shape.

In addition, due to the formation of the connection part 105', additional processing to be described later of the body-part forming part 100', which has a thin and small size, may be easily performed. [S400, the laser cutting step]

After the laser cutting step is performed, the additional processing step of additionally processing the base material 2 in which the body-part forming part 100' is formed may be performed.

At the additional processing step, mechanical processing or chemical processing may be performed so that the body-part forming part 100' has the final shape of the body part 100.

For example, the additional processing step may include a heat treatment step of heating the body-part forming part 100', and the shape processing step of allowing the front and rear surfaces of the body-part forming part 100' to consider the shapes of tooth surfaces. In addition, the additional processing step may include the polishing step of polishing the body-part forming part 100 at which the shape processing step is completed.

The work order of the heat treatment step, the shape processing step, and the polishing step is not limited to an order in which the steps are listed, and may be changed in various ways depending on work efficiency. For example, after the shape processing step, the polishing step may be performed, and after the polishing step is performed, the heat treatment step may be performed. Alternatively, after the shape processing step, the heat treatment step may be performed, and after the heat treatment step, the polishing step may be performed.

Hereinafter, a case in which the shape processing step is performed after the heat treatment step and the polishing step is performed after the shape processing step will be described in detail as an example.

The base material 2 in which the body-part forming part 100' is formed may be put into a heat treatment device 3, and may be heat treated.

A method of heat-treating a plate of a shape memory alloy has been variously disclosed in the prior art, and thus more detailed description thereof will be omitted.

Due to heat treatment, the body-part forming part 100' may have higher hardness and a shape thereof may be stabilized. As a result, the body part 100 formed by the body-part forming part 100' may have higher hardness, and a shape thereof may be stabilized. [S510, the heat treatment step]

After the heat treatment step is performed, the shape processing of the body-part forming part 100' may be performed.

The shape processing may be performed by various tools and devices by which the surface of the body-part forming part 100' can be cut. For example, the shape processing may be performed by a cone-shaped bur 4.

Due to the characteristics of laser processing, it is difficult to form a vertical curve or inclination on a cut surface. Accordingly, by using a cutting tool or device, the front and rear surfaces of the body-part forming part 100' may be processed to have vertical curves and inclinations considering the shapes of tooth surfaces and interdental space of teeth.

Specifically, while the opposite ends of the body-part forming part 100' are connected to the base material 2, the front surface of the body-part forming part 100' constituting the front surface of the body part 100 may be processed by using the bur.

In this case, the front surface of the body-part forming part 100' may be processed to fit the shapes of tooth surface and interdental space of each tooth based on the scanning data.

For example, in the front surface of the body-part forming part 100', a part corresponding to the curved protrusion part 120 may be processed to have a width decreasing or increasing upward by considering the shape of a corresponding interdental space.

In addition, in the front surface of the body-part forming part 100', a part corresponding to a tooth having upward inclination forward in a tooth surface may be processed to have a shape having an upward inclination forward.

Furthermore, in the front surface of the body-part forming part 100', a part corresponding to a tooth having downward inclination forward in a tooth surface may be processed to have a shape having a downward inclination forward.

Additionally, in the front surface of the body-part forming part 100', a part corresponding to a tooth curved in a tooth surface may be processed to have a curved shape.

Meanwhile, the rear surface of the body-part forming part 100' constituting the rear surface of the body part 100 may be processed into a shape corresponding to the processed shape of the front surface of the body-part forming part 100'.

In this case, the processing of the rear surface of the body-part forming part 100' may be performed after turning the base material 2 upside down.

Since rear surface of the body-part forming part 100' is processed into a shape corresponding to the processed shape of the front surface of the body-part forming part 100', the front-to-rear thickness of the body part 100 may be formed to be even in a vertical direction. Accordingly, the body part 100 may stably provide an even teeth support force. [S520, the shape processing step]

After the shape processing step is performed, the polishing step of polishing the body-part forming part 100' may be performed.

In the polishing step, the body-part forming part 100' may be polished by various polishing tools and devices capable of polishing the surface of the body-part forming part 100'.

The method of polishing the plate of a shape memory alloy is disclosed in various ways in the prior art and thus detailed description thereof will be omitted.

Due to the polishing, the body part 100 may be formed to have a smoother surface, and a sharp part of the body part 100 may be removed, so the body part 100 may be formed to have a safe structure as a whole.

Specifically, during the laser cutting, flashes may be formed on the body-part forming part 100' due to the melting of the base material. In addition, during the shape processing, iron thorns may be formed in a processing portion.

Flashes, iron thorns, and corners are processed by the polishing process, so that the surface of the body-part forming part 100' can be formed more smoothly and sharp parts thereof can be removed. [S530, the polishing step]

After the additional processing step is completed, the body-part forming part 100' is separated from the base material 2, and the body part 100 may be manufactured to have a final shape.

Of course, after additional processing is applied to the body-part forming part 100' after the separation of the body-part forming part 100', the manufacturing of the body part 100 may be completed. For example, after the body-part forming part 100' is separated, each of the separated opposite ends is processed into a smooth shape without any bumps through polishing, and then the manufacturing of the body part 100 may be completed. [S600, the body-part separating step]

According to the adhesive retainer 1 according to the embodiment of the present disclosure described above, the body part 100 attached to the tooth arrangement is formed by considering the shape of a tooth surface and the shape of interdental space.

Accordingly, the body part 100 is stably brought into close contact with each tooth, so foreign matter can be prevented from being caught in space between the body part 100 and teeth, and the body part 100 can be more stably attached to the teeth.

In addition, the support part 110 is formed to have front-to-rear thickness and vertical height which are constant, and thus can stably support each tooth constituting a tooth arrangement. Accordingly, the correction effect of the tooth arrangement can be maximized.

Furthermore, the curved protrusion part 120 having a bent shape is formed to have front-to-rear thickness larger than the front-to-rear thickness of the support part 110, thereby effectively preventing the curved protrusion part from being broken.

Additionally, the protruding end part of the curved protrusion part 120 is formed to be round, thereby effectively preventing the breakage of the protruding end part and enabling the body part 100 to have more excellent durability.

In addition, the curved protrusion part 120 is formed to have a width decreasing or increasing upward by corresponding to the shape of the interdental space to which the curved protrusion part 120 corresponds. Accordingly, the curved protrusion part 120 can be stably inserted into the interdental space without interruption and can be tightly in close with the inner side surfaces of teeth defining the interdental space.

Meanwhile, according to the manufacturing method of an adhesive retainer according to the embodiment of the present disclosure described above, the body part 100 is formed as one integrated component, so manufacturing costs of the retainer 1 can be reduced.

In addition, the body part 100 is manufactured by being laser cut based on the three-dimensional scanning data about tooth arrangement, thereby greatly reducing period required for manufacturing the retainer.

Furthermore, since time required for manufacturing the retainer is reduced, during the manufacturing period of the retainer, the deformation of the tooth arrangement is minimized, and accordingly, the manufactured retainer and teeth are stably matched, so the attaching time of the retainer can be minimized. Accordingly, a patient's treatment satisfaction can be greatly improved.

In addition, during the formation of the body-part forming part 100' by laser cutting of the base material 2, while the opposite ends of the body-part forming part 100' are connected to the base material 2, the body-part forming part 100' is cut and formed. Accordingly, during the laser cutting, the body-part forming part 100' can be prevented from being deformed by external force or heat due to during additional processing, and the shape defect of the body part 100 can be prevented.

Furthermore, due to the characteristics of laser processing, it is difficult to form a vertical curve or inclination on a cut surface. However, in the manufacturing method of an adhesive retainer according to the embodiment of the present disclosure, after generating a processing line defining a laser-cut shape based on the three-dimensional scanning data about tooth arrangement, the base material is laser cut along the processing line to form the body-part forming part 100'. Next, through additional processing, the front and rear surfaces of the body-part forming part 100' are processed by considering the shapes of tooth surfaces and interdental spaces of teeth.

Accordingly, the body part 100 can be manufactured by considering the vertical curves and inclinations of the teeth in consideration of the shapes of tooth surfaces and interdental spaces of the teeth in the front and rear surfaces of the body part.

The invention claimed is:

1. A manufacturing method of an adhesive retainer which has a body part comprising a curved protrusion part protruding to be inserted into an interdental space and a support part in close contact with a tooth surface of each tooth outside the interdental space such that the body part is in close contact with tooth surfaces of multiple teeth which constitute a tooth arrangement, the method comprising:
    a step of acquiring three-dimensional scanning data about the tooth arrangement by using a three-dimensional scanning device;
    a data processing step of generating a first processing line extending along tooth surfaces and interdental spaces of teeth and a second processing line spaced apart rearward from the first processing line, based on the scanning data,
    wherein in the data processing step, the first processing line and the second processing line are processed to be spaced more apart from each other in a portion corresponding to the curved protrusion part than in a portion corresponding to the support part, and
    opposite ends of the first processing line and opposite ends of the second processing line are generated to be spaced apart from each other;
    a laser cutting step of laser cutting a flat plate-shaped base material formed of a shape memory alloy material based on processing line data comprising data of the first processing line and the second processing line so as to form a body-part forming part having a basic shape of the body part in the base material,
    wherein in the laser cutting step, the body-part forming part is laser cut such that opposite ends of the body-part forming part are connected integrally to the base material; and
    a shape processing step of cutting the body-part forming part to have surfaces that conform to shapes of the tooth surfaces and interdental spaces of teeth,
    wherein in the shape processing step, the body-part forming part is cut in a state in which the opposite ends of the body-part forming part are connected integrally to the base material;
    a heat treatment step of heat-treating the body-part forming part for shape stabilization performed in a state in which the opposite ends of the body-part forming part remain connected integrally to the base material,
    wherein the heat treatment step is carried out after the laser cutting step and before or after the shape processing step; and
    a body-part separating step of separating the body-part forming part from the base material,
    wherein the body-part separating step is carried out after a completion of the shape processing step and the heat treatment step, and
    wherein in the body part, the curved protrusion part is formed to be thicker in a front- to-rear thickness than the support part.

2. The method of claim 1, wherein a protruding end part of the curved protrusion part is formed to be round, and
    in the data processing step, a part of each of the first processing line and the second processing line corresponding to the protruding end part of the curved protrusion part is processed to be round.

3. The method of claim 1, further comprising:
    a polishing step of polishing the base material in which the body-part forming part is formed.

* * * * *